（12） United States Patent
Ohsawa et al.

(10) Patent No.: US 8,014,103 B2
(45) Date of Patent: Sep. 6, 2011

(54) SUSPENSION BOARD WITH CIRCUIT (75) Inventors: Tetsuya Ohsawa, Osaka (JP); Toshiki Naito, Osaka (JP); Hirotoshi Iguchi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 482 days.

(21) Appl. No.: 12/289,727

(22) Filed: Nov. 3, 2008

(65) Prior Publication Data

US 2009/0116150 A1 May 7, 2009

Related U.S. Application Data (60) Provisional application No. 60/996,393, filed on Nov. 15, 2007.

(30) Foreign Application Priority Data

Nov. 7, 2007 (JP) ................................. 2007-289804

(51) Int. Cl.
*G11B 5/48* (2006.01)
*G11B 5/60* (2006.01)
*G11B 21/21* (2006.01)

(52) U.S. Cl. ............... 360/234.6; 360/234.5; 360/245.9
(58) Field of Classification Search ............... 360/234.5, 360/234.6, 245.9
See application file for complete search history.

(56) References Cited

U.S. PATENT DOCUMENTS

| 6,282,063 | B1* | 8/2001 | Coon .......................... 360/245.3 |
| 6,349,017 | B1* | 2/2002 | Schott ........................ 360/234.6 |
| 6,801,398 | B1* | 10/2004 | Ohwe et al. ................. 360/234.6 |
| 7,006,331 | B1* | 2/2006 | Subrahmanyam et al. 360/245.9 |
| 7,545,605 | B2* | 6/2009 | Hagiya et al. ............... 360/234.5 |
| 7,859,793 | B2* | 12/2010 | Uematsu et al. ............ 360/234.6 |
| 2003/0090839 | A1* | 5/2003 | Segar et al. ................. 360/245.9 |
| 2006/0087768 | A1* | 4/2006 | Erpelding et al. .......... 360/234.5 |
| 2006/0203389 | A1* | 9/2006 | Motonishi ................... 360/234.6 |
| 2006/0209462 | A1* | 9/2006 | Kajitani et al. ............. 360/234.6 |
| 2007/0263323 | A1* | 11/2007 | Uematsu et al. ............ 360/234.6 |
| 2008/0266714 | A1* | 10/2008 | Feng et al. .................. 360/234.6 |

FOREIGN PATENT DOCUMENTS

| JP | 05144207 A | * | 6/1993 |
| JP | 06349035 A | * | 12/1994 |
| JP | 07169224 A | * | 7/1995 |
| JP | 10-27447 | | 1/1998 |
| JP | 11039627 A | * | 2/1999 |
| JP | 2000-215428 | | 8/2000 |
| JP | 2000-298812 | | 10/2000 |

* cited by examiner

*Primary Examiner* — Will J Klimowicz
(74) *Attorney, Agent, or Firm* — Jean C. Edwards, Esq.; Edwards Neils PLLC (57) ABSTRACT

A suspension board with circuit includes a metal supporting board, an insulating layer formed on the metal supporting board, a conductive layer formed on the insulating layer, and a pedestal for supporting a slider. The pedestal includes a lower pedestal made of the insulating layer, and formed in a continuous frame shape so as to surround a bonding surface of the metal supporting board to the slider, and an upper pedestal made of the conductive layer, and formed in a discontinuous frame shape on the lower pedestal.

3 Claims, 4 Drawing Sheets

SUSPENSION BOARD WITH CIRCUIT

CROSS-REFERENCE TO RELATED APPLICATION

The present application claims the benefit of U.S. Patent Provisional Application No. 60/996,393 filed on Nov. 15, 2007, and claims priority from Japanese Patent Application No. 2007-289804 filed on Nov. 7, 2007, the contents of which are herein incorporated by reference in their entirety.

BACKGROUND OF THE INVENTION

1. Field of the Invention

The present invention relates to a suspension board with circuit and, more particularly, to a suspension board with circuit mounted in a hard disk drive.

2. Description of the Related Art

On a suspension board with circuit mounted in a hard disk drive, a magnetic head is mounted. Specifically, a slider on which a magnetic head is mounted is mounted on the front end portion of the suspension board with circuit.

For example, it is proposed that a bonding surface for bonding to a slider substrate is formed at the front end portion of a suspension, and four rod-shaped spacers having the same thickness are provided so as to spaced-apart from each other at the peripheral end portion of the bonding surface to form a rectangular frame shape surrounding the inner portion of the bonding surface (see, e.g., Japanese Unexamined Patent Publication No. 10-27447).

In Japanese Unexamined Patent Publication No. 10-27447, an adhesive is coated on the bonding surface to have a thickness not less than the thicknesses of the spacers. Then, the slider substrate is placed on the spacers to expel the adhesive from the gaps between the individual spacers and brought into contact with the spacers, and then the adhesive is solidified to support the slider substrate.

SUMMARY OF THE INVENTION

However, in Japanese Unexamined Patent Publication No. 10-27447, the slider substrate is placed on the spacers to expel the adhesive from the gaps between the individual spacers. Therefore, when the adhesive is expelled in an excessive amount, it may be the case where the slider substrate cannot be reliably bonded to the bonding surface due to the shortage of the adhesive.

On the other hand, if the spacers are formed in a rectangular frame shape continuously surrounding the inner portion of the bonding surface without any gaps, the adhesive overflows from over the spacers when the slider substrate is placed on the spacers. As a result, the slider substrate may tilt into an unstable position.

It is therefore an object of the present invention to provide a suspension board with circuit which allows a slider to be reliably bonded, and supported in a stable position.

A suspension board with circuit of the present invention includes a metal supporting board, an insulating layer formed on the metal supporting board, a conductive layer formed on the insulating layer, and a pedestal for supporting a slider, wherein the pedestal includes a lower pedestal made of the insulating layer, and formed in a continuous frame shape so as to surround a bonding surface of the metal supporting board to the slider, and an upper pedestal made of the conductive layer, and formed in a discontinuous frame shape on the lower pedestal.

In the suspension board with circuit of the present invention, the lower pedestal is formed in the continuous frame shape, and the upper pedestal is formed in the discontinuous frame shape. The arrangement restricts the outflow of an adhesive coated on the bonding surface from the lower pedestal, and ensures a sufficient amount of the adhesive required for bonding. Conversely, when the adhesive is coated in an excessive amount, the adhesive coated in an excessive amount is allowed to flow out from the discontinuous portion of the upper pedestal. As a result, it is possible to stably place the slider on the pedestal, and reliably bond the slider to the bonding surface. Therefore, the slider can be stably maintained in a steady floating position (angle).

In the suspension board with circuit of the present invention, it is preferable that the lower pedestal is formed of a continuous surrounding wall, and the upper pedestal is formed of a surrounding wall formed with one cut-away portion.

When the cut-away portion of the upper pedestal is one, the adhesive coated in an excessive amount is allowed to flow out only from the one cut-away portion. As a result, it is possible to reduce a wide range of contamination with the adhesive over the suspension board with circuit.

The suspension board with circuit of the present invention further includes a terminal portion made of the conductive layer, and disposed adjacent to the pedestal, wherein the cut-away portion is formed in a portion of the surrounding wall of the upper pedestal opposite to a portion thereof adjacent to the terminal portion.

When the cut-away portion is formed in the portion of the surrounding wall opposite to the portion thereof adjacent to the terminal portion, even though the adhesive flows out from the cut-away portion, it is possible to prevent the adhesive from entering the terminal portion. This allows an improvement in the connection reliability of the terminal portion.

DETAILED DESCRIPTION OF THE INVENTION

Figure 1:
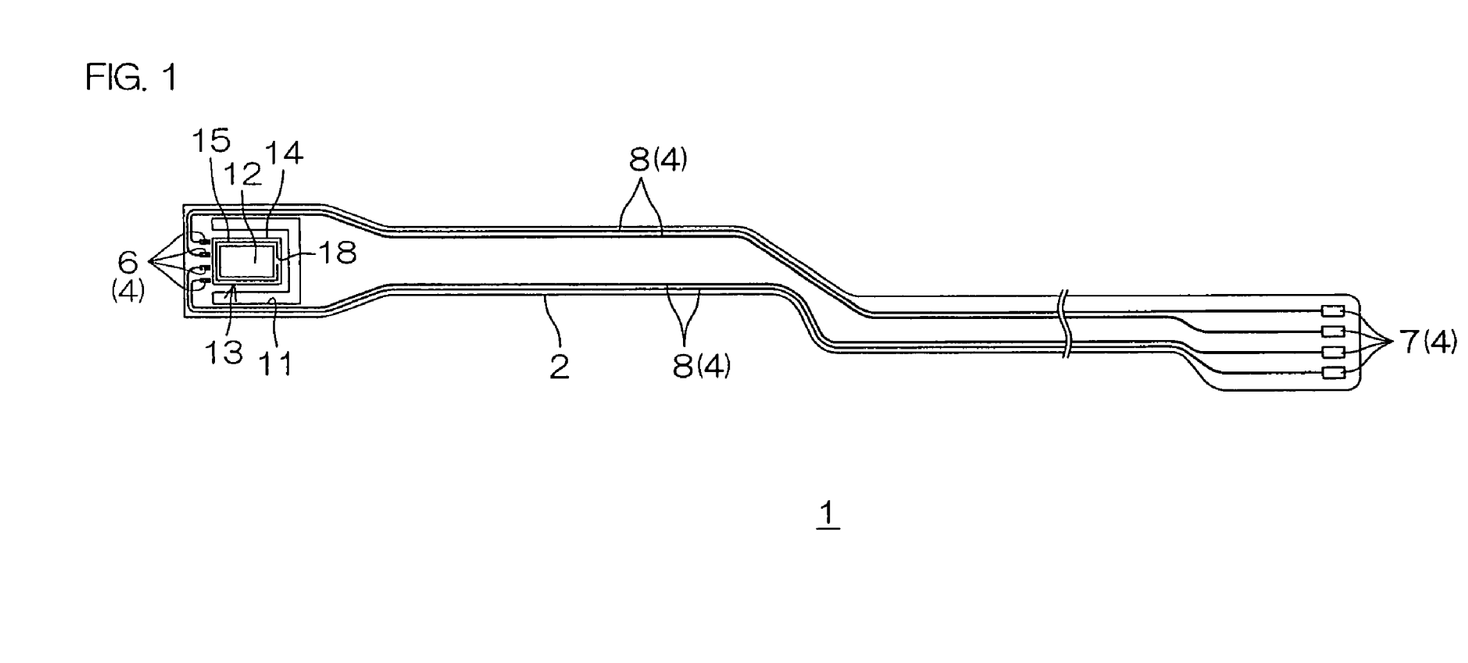
FIG. 1 is a plan view of a suspension board with circuit according to an embodiment of the present invention.
Figure 2:
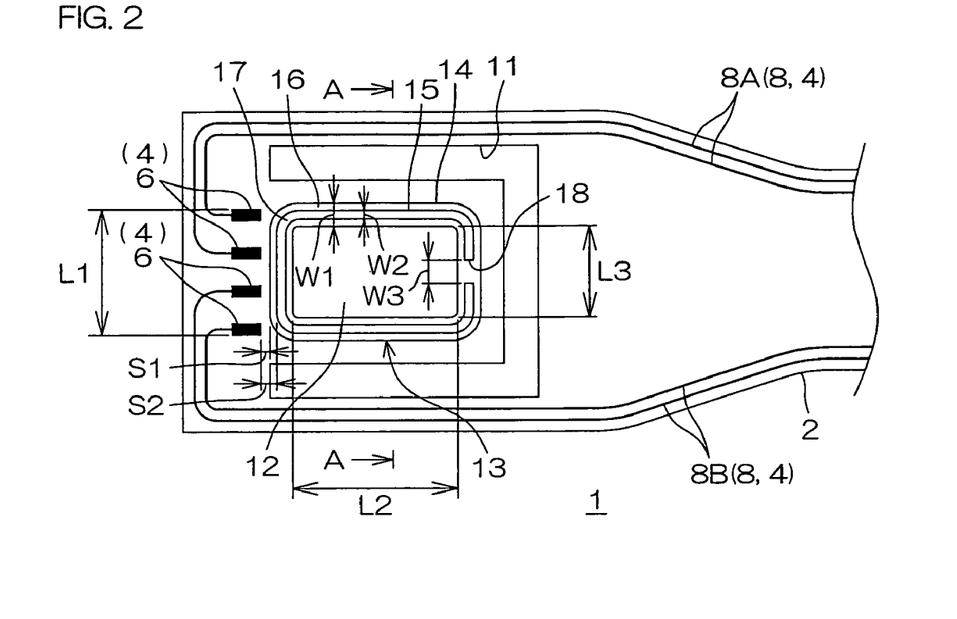
FIG. 2 is an enlarged plan view of the front end portion of the suspension board with circuit shown in FIG. 1.
Figure 3:
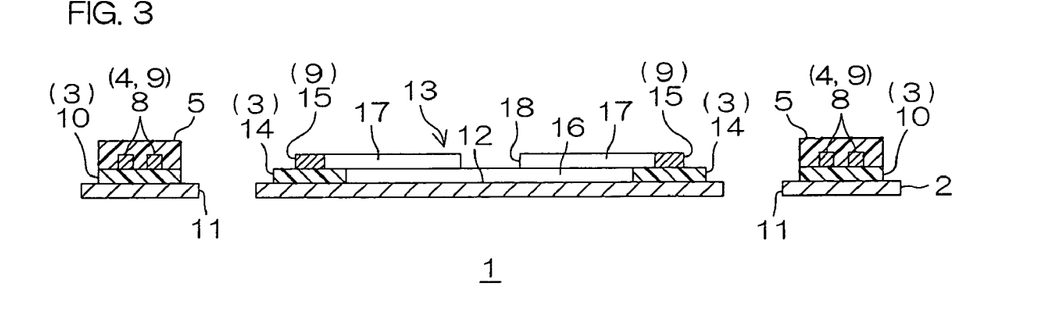
FIG. 3 is a cross-sectional view taken along the line A-A of FIG. 2.
Figure 4:
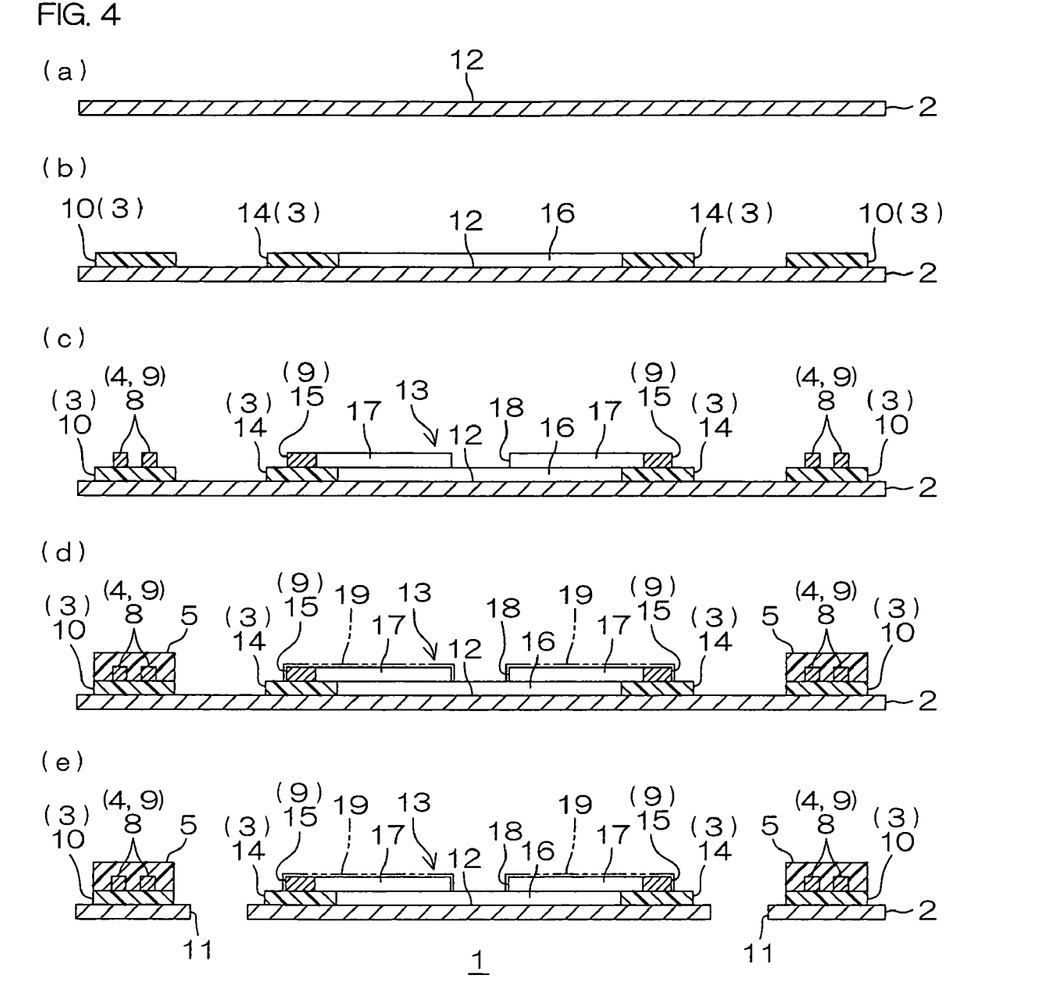
FIG. 4 is a process view of a producing method of the suspension board with circuit shown in FIG. 1, (a) showing the step of preparing a metal supporting board, (b) showing the step of forming an insulating base layer, (c) showing the step of forming a conductive layer, (d) showing the step of forming an insulating cover layer, and (e) showing the step of forming a U-shaped opening.
Figure 5:
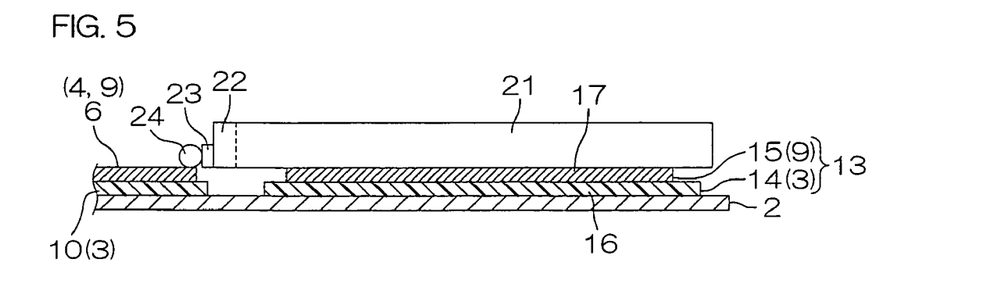
FIG. 5 is a cross-sectional view showing a state where a slider is mounted on the suspension board with circuit shown in FIG. 1.

FIG. 1 is a plan view of a suspension board with circuit according to an embodiment of the present invention. FIG. 2 is an enlarged plan view of the front end portion of the suspension board with circuit shown in FIG. 1. FIG. 3 is a cross-sectional view taken along the line A-A of FIG. 2. FIG. 4 is a process view of a producing method of the suspension board with circuit shown in FIG. 1. FIG. 5 is a cross-sectional view showing a state where a slider is mounted on the suspension board with circuit shown in FIG. 1. In FIGS. 1 and 2, an insulating base layer 3 (described later) and an insulating cover layer 5 (described later) are omitted for clear illustration of relative positioning of a conductive pattern 4.

In FIG. 1, in a suspension board with circuit 1, the conductive pattern 4 for electrically connecting a magnetic head 22 (see FIG. 5) and a read/write board (not shown) is formed integrally on a metal supporting board 2 extending in a longitudinal direction.

The conductive pattern 4 integrally includes magnetic-head-side connection terminal portions 6 (which may be hereinafter simply referred to as the "terminal portions 6") for connecting to connection terminals 23 (see FIG. 5) of the magnetic head 22, external connection terminal portions 7 for connecting to connection terminals (not shown) of the read/write board, and wires 8 for connecting the magnetic-head-side connection terminal portions 6 and the external connection terminal portions 7.

A plurality (four) of the wires 8 are provided in parallel along the longitudinal direction of the metal supporting board 2 to be arranged in mutually spaced-apart relation in a widthwise direction (perpendicular to the longitudinal direction).

A plurality (four) of the magnetic-head-side connection terminal portions 6 are formed as quadrilateral lands provided in parallel to be disposed in widthwise spaced-apart relation at the front end portion (one longitudinal end portion) of the metal supporting board 2, and connected to the respective front end portions of the wires 8.

A plurality (four) of the external connection terminal portions 7 are formed as quadrilateral lands provided in parallel to be disposed in widthwise spaced-apart relation at the rear end portion (the other longitudinal end portion) of the metal supporting board 2, and connected to the respective rear end portions of the wires 8.

As shown in FIG. 3, the suspension board with circuit 1 includes the metal supporting board 2, the insulating base layer 3 as an insulating layer formed on the metal supporting board 2, a conductive layer 9 formed on the insulating base layer 3, and an insulating cover layer 5 formed on the insulating base layer 3 to cover the wires 8.

The insulating base layer 3 includes a pattern formation portion 10 formed on the surface of the metal supporting board 2 in correspondence to the conductive pattern 4, and a lower pedestal 14 (described later).

The conductive layer 9 includes the conductive pattern 4 mentioned above, and an upper pedestal 15 (described later).

The insulating cover layer 5 is formed on the surface of the pattern formation portion 10 so as to cover the wires 8, and expose the magnetic-head-side connection terminal portions 6 and the external connection terminal portions 7.

Next, a detailed description is given to the front end portion of the suspension board with circuit 1 with reference to FIGS. 2 and 3.

As shown in FIG. 2, the front end portion of the suspension board with circuit 1 is provided with the terminal portions 6, a U-shaped opening 11, and a bonding surface 12 for bonding to a slider 21 (see FIG. 5), and a pedestal 13 for supporting the slider 21 (see FIG. 5).

The terminal portions 6 are disposed in parallel at the front end edge portion of the suspension board with circuit 1 to be arranged in mutually spaced-apart relation in the widthwise direction. The respective rear end surfaces of the terminal portions 6 are disposed to be flush with each other in the widthwise direction. The front ends of the terminal portions 6 are connected individually to the wires 8. That is, the wires 8 are routed such that a pair of (two) wires 8A on one widthwise side and a pair of (two) wires 8B on the other widthwise side, which have extended along the both widthwise end portions (the both widthwise outer sides of the U-shaped opening 11) of the front end portion of the suspension board with circuit 1, and reached the front end edge portion, are inwardly bent in the widthwise direction, and further rearwardly bent to connect to the respective front ends of the terminal portions 6.

The width (widthwise length) of each of the terminal portions 6 is in a range of, e.g., 15 to 200 μm, or preferably 50 to 100 μm. The spacing (widthwise spacing) between the individual terminal portions 6 is in a range of, e.g., 15 to 200 μm, or preferably 20 to 100 μm. Accordingly, a distance L1 between the two terminal portions 6 disposed on the both widthwise outermost sides is set to a range of, e.g., 400 to 1100 μm, or preferably 500 to 1000 μm.

The U-shaped opening 11 is formed in a generally U-shaped shape which is opened toward the front side when viewed in plan view. The U-shaped opening 11 is formed to extend through the metal supporting board 2 in a thickness direction. The U-shaped opening 11 is disposed between the pair of wires 8A on one widthwise side and the pair of wires 8B on the other widthwise side. Specifically, a margin between the U-shaped opening 11 and each of the both widthwise end edges of the metal supporting board 2 is set to allow the passage of the pair of wires 8 therethrough on each of the both widthwise outer sides of the U-shaped opening 11, while a margin between the U-shaped opening 11 and the front end edge of the metal supporting board 2 is set to allow the terminal portions 6 to be disposed on the front edge portion of the metal supporting board 2.

The bonding surface 12 is defined in a generally rectangular shape when viewed in plan view at a portion of the surface of the metal supporting board 2 widthwise inner than the U-shaped opening 11 such that the slider 21 (see FIG. 5) is disposed in opposing relation thereto. The bonding surface 12 is disposed in longitudinally spaced-apart and adjacent relation to the terminal portions 6

A longitudinal length L2 of the bonding surface 12 is set to a range of, e.g., 0.3 to 1.5 mm, or preferably 0.5 to 1.0 mm. A widthwise length L3 of the bonding surface 12 is set to a range of, e.g., 0.2 to 1.3 mm, or preferably 0.3 to 1.0 mm.

The pedestal 13 is disposed on the side widthwise inner than the U-shaped opening 11 so as to surround the bonding surface 12, and includes the lower pedestal 14 and the upper pedestal 15.

As shown in FIG. 3, the lower pedestal 14 is made of the insulating base layer 3 provided on the surface of the metal supporting board 2. As shown in FIGS. 2 and 3, the lower pedestal 14 is formed of a lower surrounding wall 16 continuously surrounding the bonding surface 12 without any gaps. The lower surrounding wall 16 is formed in a generally rectangular shape when viewed in cross section. The front end portion of the lower surrounding wall 16 is disposed to oppose (disposed adjacent to) the terminal portions 6 at a distance (distance S1 in a range of, e.g., 10 to 200 μm, or preferably 20 to 150 μm) spaced apart therefrom in the longitudinal direction. The rear end portion of the lower surrounding wall 16 is disposed to oppose (disposed adjacent to) the widthwise extending rear end portion of the U-shaped opening 11 at a distance spaced apart therefrom in the longitudinal direction. A width W1 of the lower surrounding wall 16 is in a range of, e.g., 50 to 150 μm, or preferably 80 to 110 μm. The thickness of the lower surrounding wall 16 is the thickness of the insulating base layer 3, which is in a range of, e.g., 1 to 20 μm, or preferably 1 to 10 μm.

In this manner, the lower pedestal 14 is formed in a rectangular frame shape continuously surrounding the bonding surface 12 when viewed in plan view. The four corners of the lower pedestal 14 are each formed in a curved shape.

The upper pedestal 15 is made of the conductive layer 9 provided on the lower pedestal 14. As shown in FIGS. 2 and 3, the upper pedestal 15 is formed of an upper surrounding wall 17 surrounding the bonding surface 12, and formed with one cut-away portion 18.

That is, the upper surrounding wall 17 is formed in a generally rectangular shape when viewed in cross section on the lower surrounding wall 16 so as to surround the bonding surface 12 along the lower surrounding wall 16. Specifically, the upper surrounding wall 17 is formed at the widthwise center of the upper surface of the lower surrounding wall 16 to have a width smaller than that of the lower surrounding wall 16 such that a margin is formed on each of the both widthwise end portions of the lower surrounding wall 16.

The front end portion of the upper surrounding wall 17 is disposed to oppose (disposed adjacent to) the terminal portions 6 at a distance (distance S2 in a range of, e.g., 30 to 250 μm, or preferably 50 to 180 μm) spaced apart therefrom in the longitudinal direction. The rear end portion (i.e., the rear end portion opposite to the front end portion disposed adjacent to the terminal portions 6) of the upper surrounding wall 17 is disposed to oppose (disposed adjacent to) the rear end portion of the U-shaped opening 11 at a distance spaced apart therefrom in the longitudinal direction.

A width W2 of the upper surrounding wall 17 is set to a range of, e.g., 10% to 100%, or preferably 20% to 60% of the width W1 of the lower surrounding wall 16 when the width W1 is assumed to be 100%. Specifically, the width W2 is in a range of, e.g., 15 to 150 μm, or preferably 30 to 90 μm. The thickness of the upper surrounding wall 17 is the thickness of the conductive layer 9, which is in a range of, e.g., 3 to 50 μm, or preferably 5 to 25 μm.

The cut-away portion 18 is formed in the widthwise center of the rear end portion of the upper surrounding wall 17. Specifically, the cut-away portion 18 is formed as an aperture portion in a generally rectangular shape which longitudinally extends through the rear end portion of the upper surrounding wall 17, and faces the U-shaped opening 11. The cut-away portion 18 is formed as an aperture extending through the entire thickness of the upper surrounding wall 17. A width W3 of the cut-away portion 18 is in a range of, e.g., 10 to 400 μm, or preferably 20 to 250 μm. The aperture area of the cut-away portion 18 is in a range of, e.g., 0.007% to 30%, or preferably 0.06% to 15% of the area of the bounding surface 12 when the area of the bonding surface 12 is assumed to be 100%.

In this manner, the upper pedestal 15 is formed in a rectangular frame shape discontinuously surrounding the bonding surface 12 when viewed in plan view. The four corners of the upper pedestal 15 are each formed in a curved shape.

As necessary, metal plating layers 19 are provided on the respective surfaces of the magnetic-head-side connection terminal portions 6, the external connection terminal portions 7, and the upper pedestal 15 (see FIGS. 4(d) and 4(e)).

Next, a description is given to a producing method of the suspension board with circuit 1 with reference to FIG. 4.

First, as shown in FIG. 4(a), the metal supporting board 2 is prepared in the method.

Examples of a metal material used to form the metal supporting board 2 include stainless steel and 42 alloy. Preferably, stainless steel is used. The thickness of the metal supporting board 2 is in a range of, e.g., 15 to 30 μm, or preferably 15 to 25 μm.

Next, as shown in FIG. 4(b), the insulating base layer 3, i.e., the pattern formation portion 10 and the lower pedestal 14 are simultaneously formed.

Examples of an insulating material used to form the insulating base layer 3 include synthetic resins such as a polyimide resin, a polyether nitrile resin, a polyether sulfone resin, a polyethylene terephthalate resin, a polyethylene naphthalate resin, and a polyvinyl chloride resin. Among them, a photosensitive synthetic resin is preferably used, or more preferably, a photosensitive polyimide resin is used.

To form the insulating base layer 3, a varnish of a photosensitive synthetic resin, e.g., is coated on the entire surface of the metal supporting board 2, dried, exposed to light with a pattern in which the pattern formation portion 10 and the lower pedestal 14 are formed, developed, and then cured as necessary.

Alternatively, the insulating base layer 3 can also be formed in the foregoing pattern by uniformly coating a solution of the synthetic resin mentioned above on the entire surface of the metal supporting board 2, drying the solution, curing it as necessary by heating, and then performing etching or the like.

Otherwise, the insulating base layer 3 can also be formed by, e.g., forming the synthetic resin into a film in the foregoing pattern in advance, and sticking the film to the surface of the metal supporting board 2 via a known adhesive layer.

The thickness of the insulating base layer 3 (the pattern formation portion 10 and the lower pedestal 14) thus formed is in a range of, e.g., 1 to 20 μm, or preferably 1 to 10 μm.

Next, as shown in FIG. 4(c), the conductive layer 9, i.e., the conductive pattern 4 and the upper pedestal 15 are simultaneously formed.

Examples of a conductive material used to form the conductive layer 9 include copper, nickel, gold, a solder, and an alloy thereof. Among them, copper is preferably used.

To form the conductive layer 9, a known patterning method such as, e.g., an additive method or a subtractive method is used. Preferably, the additive method is used.

Specifically, in the additive method, a conductive seed film is formed first on the surface of the metal supporting board 2 including the surface of the pattern formation portion 10 and the surface of the lower pedestal 14 by a sputtering method or the like. Then, a plating resist is formed in a pattern reverse to the pattern of the pattern formation portion 10 and the lower pedestal 14 on the surface of the conductive seed film. Thereafter, the conductive pattern 4 and the upper pedestal 15 are formed by electrolytic plating on the respective surfaces of the conductive seed film on the pattern formation portion 10 and the conductive seed film on the lower pedestal 14 which are exposed from the plating resist. Thereafter, the plating resist and the portion of the conductive seed film where the plating resist is laminated are removed.

The thickness of the conductive layer 9 (the conductive pattern 4 and the upper pedestal 15) thus formed is in a range of, e.g., 3 to 50 μm, or preferably 5 to 25 μm.

Next, as shown in FIG. 4(d), the insulating cover layer 5 is formed on the upper surface of the pattern formation portion 10 so as to cover the wires 8, and expose the magnetic-head-side connection terminal portions 6 and the external connection terminal portions 7. As an insulating material used to form the insulating cover layer 5, the same insulating material as used to form the insulating base layer 3 can be listed.

To form the insulating cover layer 5, a varnish of a photosensitive synthetic resin, e.g., is coated on the entire upper surface of the pattern formation portion 10, dried, exposed to light with a pattern which covers the wires 8, and exposes the magnetic-head-side connection terminal portions 6 and the external connection terminal portions 7, developed, and then cured as necessary.

Alternatively, the insulating cover layer 5 can also be formed in the foregoing pattern by uniformly coating a solution of the synthetic resin mentioned above on the entire upper surface of the pattern formation portion 10, drying the solution, curing it as necessary by heating, and then performing etching or the like.

Otherwise, the insulating cover layer 5 can also be formed by, e.g., forming the synthetic resin into a film in the foregoing pattern in advance, and sticking the film to the surface of the pattern formation portion 10 via a known adhesive layer.

The thickness of the insulating cover layer 5 thus formed is in a range of, e.g., 2 to 25 μm, or preferably 5 to 15 μm.

Thereafter, as indicated by the imaginary lines in FIG. 4(d), the metal plating layers 19 are formed as necessary on the respective surfaces of the magnetic-head-side connection terminal portions 6, the external connection terminal portions 7, and the upper pedestal 15. The metal plating layers 19 are made of gold or nickel by electrolytic plating or electroless plating. The thicknesses of the metal plating layers 19 are in a range of, e.g., 0.5 to 5 μm, or preferably 0.5 to 3 μm.

Next, as shown in FIG. 4(e), the metal supporting board 2 is cut out by chemical etching to form the U-shaped opening 11, while being trimmed, whereby the suspension board with circuit 1 is obtained.

On the suspension board with circuit 1 thus produced, the slider 21 on which the magnetic head 22 is to be mounted is mounted. Then, the connection terminals 23 of the magnetic head 22 and the terminal portions 6 are electrically connected.

Next, a description is given to a method for mounting the slider 21 on the suspension board with circuit 1, and connecting the connection terminals 23 of the magnetic head 22 and the terminal portions 6 with reference to FIG. 5.

The slider 21 is formed in a rectangular flat plate shape of a size slightly larger than that of the bonding surface 12, and has the magnetic head 22 mounted on the front end portion thereof.

In the method, an adhesive is coated first on the bonding surface 12 located within the pedestal 13. As the adhesive, a known adhesive is used. For the coating of the adhesive, a known coating method such as a printing method or an ink jet method is used. For example, the adhesive is coated on the bonding surface 12 so as to protrude from the pedestal 13 till reaching a position above the upper pedestal 15.

Then, the slider 21 is placed on the pedestal 13 such that the lower surface of the slider 21 comes in contact with the upper surface (upper surface of the metal plating layer 30 when it is formed) of the upper pedestal 15. Specifically, the slider 21 is placed such that the connection terminals 23 of the magnetic head 22 oppose the terminal portions 6 in the longitudinal direction.

At this time, the excess adhesive protruding from the pedestal 13 is pressed into the interior of the pedestal 13 by the lower surface of the slider 21, while the adhesive which cannot be allowed to be within the interior of the pedestal 13 flow out from the cut-away portion 18.

Then, by curing the adhesive at a room temperature or by the application of heat, the slider 21 is bonded to the bonding surface 12 via the adhesive. At this time, since the slider 21 is supported on the pedestal 13, the slider 21 is maintained in a steady position.

Thereafter, solder balls 24 are disposed between the connection terminals 23 of the magnetic head 22 and the terminals 6 (or the metal plating layers 19 formed on the surfaces of the terminal portions 6). The solder balls 24 are formed of a known solder material. The solder balls 24 are melted, and then solidified to electrically connect the connection terminals 23 of the magnetic head 22 and the terminal portions 6.

In the suspension board with circuit 1, the lower pedestal 14 is formed in a continuous frame shape, and the upper pedestal 15 is formed in a discontinuous frame shape formed with the cut-away portion 18. The arrangement restricts the outflow of the adhesive coated on the bonding surface 12 from the lower pedestal 14 during the mounting of the slider 21, and can ensure a sufficient amount of the adhesive required for bonding. On the other hand, the adhesive excessively charged in the pedestal 13 is caused to flow out of the interior of the pedestal 13 from the cut-away portion 18 of the upper pedestal 15.

This allows stable placement of the slider 21 on the pedestal 13, and reliable bonding of the slider 21 to the bonding surface 12. Therefore, it is possible to stably maintain the slider 21 in a steady floating position (angle).

The upper pedestal 15 is formed of the upper surrounding wall 17 formed with the one cut-away portion 18. When the cut-away portion 18 of the upper pedestal 15 is one, the adhesive coated in an excessive amount is allowed to flow out only from the one cut-away portion 18. As a result, it is possible to reduce a wide range of contamination with the adhesive over the suspension board with circuit 1.

In particular, since the cut-away portion 18 is formed in the rear end portion of the upper surrounding wall 17, even when the adhesive flows out from the cut-away portion 18, the intrusion of the adhesive into the terminal portions 6 can be effectively prevented. Therefore, it is possible to improve the connection reliability of the terminal portions 6.

Additionally, the pedestal 13 is formed of the lower pedestal 14 made of the insulating base layer 3, and the upper pedestal 15 made of the conductive layer 9, while the terminal portions 6 are also formed as the conductive layer 9 on the pattern formation portion 10 made of the insulating base layer 3. That is, the pedestal 13 is formed to have the same layer structure and the same thickness as those of the terminal portions 6. This allows the upper and lower positions of the terminal portions 6 to coincide with those of the connection terminals 23 of the magnetic head 22. Accordingly, it is possible to further improve the connection reliability. Moreover, the lower pedestal 14 is formed simultaneously with the pattern formation portion 10, and the upper pedestal 15 is formed simultaneously with the conductive pattern 4. Therefore, an improvement in production efficiency can achieve a reduction in cost.

In the embodiment described above, the cut-away portion 18 is formed in the rear end portion of the upper surrounding wall 17. However, the cut-away portion 18 can be formed in any portion of the upper surrounding wall 17 depending on the purpose and application thereof. Also in the embodiment described above, the one cut-away portion 18 is provided, but it is also possible to form a plurality of the cut-away portions 18 depending on the purpose and application thereof.

In the present embodiment described above, the bonding surface 12 and the pedestal 13 are each formed in a generally rectangular shape when viewed in plan view. However, the shapes of the bonding surface 12 and the pedestal 13 may be selected appropriately in correspondence to the slider 21 to be mounted thereon. The bonding surface 12 and the pedestal 13 can be formed into proper shapes such as, e.g., a square shape when viewed in plan view, and a circular shape when viewed in plan view.

EXAMPLES

The present invention is described more specifically by showing the example and the comparative examples hereinbelow. However, the present invention is by no means limited to the example and the comparative examples.

Example 1

A metal supporting board made of a stainless steel foil with a thickness of 20 μm was prepared (see FIG. 4(a)).

Then, a varnish of a photosensitive polyamic acid resin was coated on the entire surface of the metal supporting board, dried, and exposed to light via a photomask, developed, and then heated to simultaneously form a pattern formation portion and a lower pedestal on the surface of the metal supporting board (see FIG. 4(b)).

The lower pedestal was formed into a rectangular frame shape from a lower surrounding wall continuously surrounding a bonding surface defined in a generally rectangular shape when viewed in plan view. The longitudinal length L2 of the bonding surface was 0.75 mm, and the widthwise length L3 thereof was 0.55 mm. The width W1 of the lower surrounding wall was 110 μm. The thickness of each of the pattern formation portion and the lower pedestal was 10 μm.

Then, in accordance with an additive method, a conductive seed film made of a chromium thin film with a thickness of 30 nm and a copper thin film with a thickness of 70 nm was formed on the surface of the metal supporting board including the surface of the pattern formation portion and the surface of the lower pedestal by a sputtering method. Subsequently, a plating resist was formed in a pattern reverse to a conductive pattern and to the pattern of an upper pedestal on the surface of the conductive seed film. Then, the conductive pattern and the upper pedestal, each made of copper, were formed on the surface of the conductive seed film exposed from the plating resist by electrolytic plating (see FIG. 4(c)). Thereafter, the plating resist and the portion of the conductive seed film where the plating resist was laminated were removed. In this manner, the conductive pattern and the upper pedestal were simultaneously formed.

The upper pedestal was formed in a rectangular frame shape on the upper surface of the lower pedestal from an upper surrounding wall surrounding the bonding surface along the lower pedestal, and formed with one cut-away portion. The upper surrounding wall was formed at the widthwise center of the upper surface of the lower surrounding wall to have a width W2 of 30 μm. The cut-away portion was formed at the widthwise center of the rear end portion of the upper surrounding wall to have a width W3 of 200 μm (which was 1.45% of the area of the bonding surface when the area of the bonding surface was assumed to be 100%).

The thickness of each of the conductive pattern and the upper pedestal was 10 μm. The width of each of magnetic-head-side connection terminal portions was 80 μm, and the spacing between the individual magnetic-head-side connection terminal portions was 50 μm. The distance L1 between the two magnetic-head-side connection terminal portions which were disposed on the both widthwise outermost sides was 730 μm. The magnetic-head-side connection terminal portions were each disposed to oppose the front end portion of the lower surrounding wall at a distance S1 of 100 μm spaced apart therefrom, and oppose the front end portion of the upper surrounding wall at a distance S2 of 150 μm spaced apart therefrom.

Then, a varnish of a photosensitive polyamic acid resin was coated on the upper surface of the pattern formation portion so as to cover the conductive pattern, dried, exposed to light via a photomask, developed, and then heated to form an insulating cover layer (see FIG. 4(d)). The thickness of the insulating cover layer was 5 μm.

Thereafter, metal plating layers made of gold with a thickness of 2 μm were formed on the respective surfaces of the magnetic-head-side connection terminal portions, the external connection terminal portions, and the upper pedestal by electrolytic plating.

Then, the metal supporting board was cut out by wet etching to form a U-shaped opening, while being trimmed, whereby a suspension board with circuit was obtained (see FIG. 4(e)).

Comparative Example 1

Figure 6:
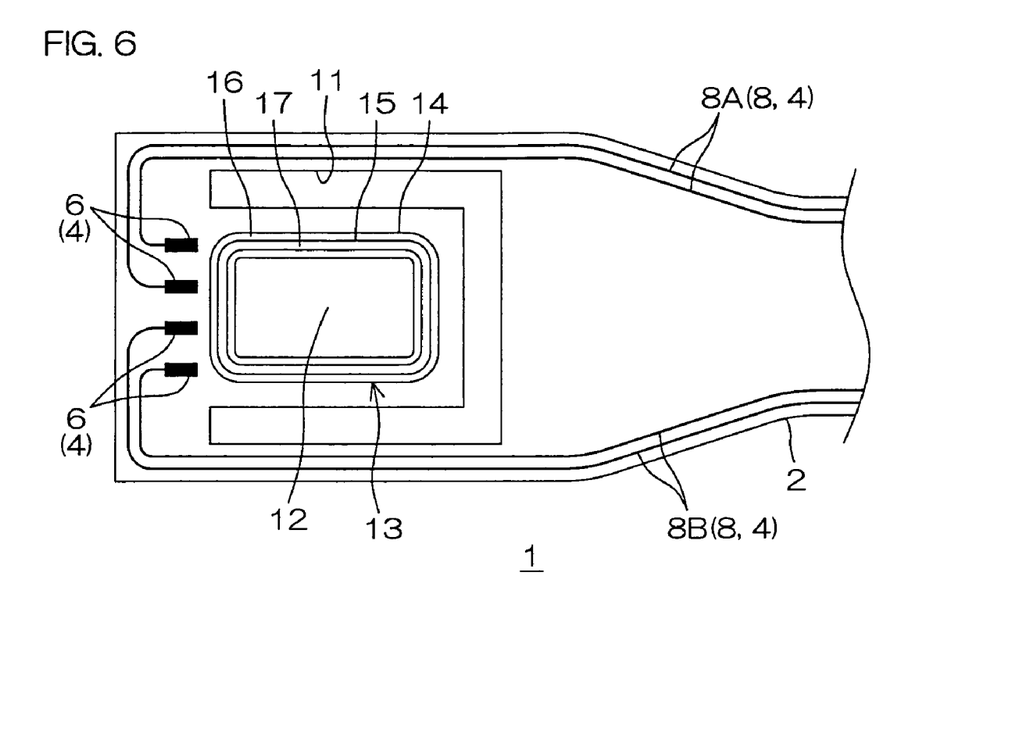
FIG. 6 is an enlarged plan view of the front end portion of the suspension board with circuit of COMPARATIVE EXAMPLE 1.

A suspension board with circuit was obtained in the same manner as in EXAMPLE 1 except that the upper pedestal was formed to continuously surround the bonding surface along the lower pedestal without forming the cut-away portion therein (see FIG. 6).

Comparative Example 2

Figure 7:
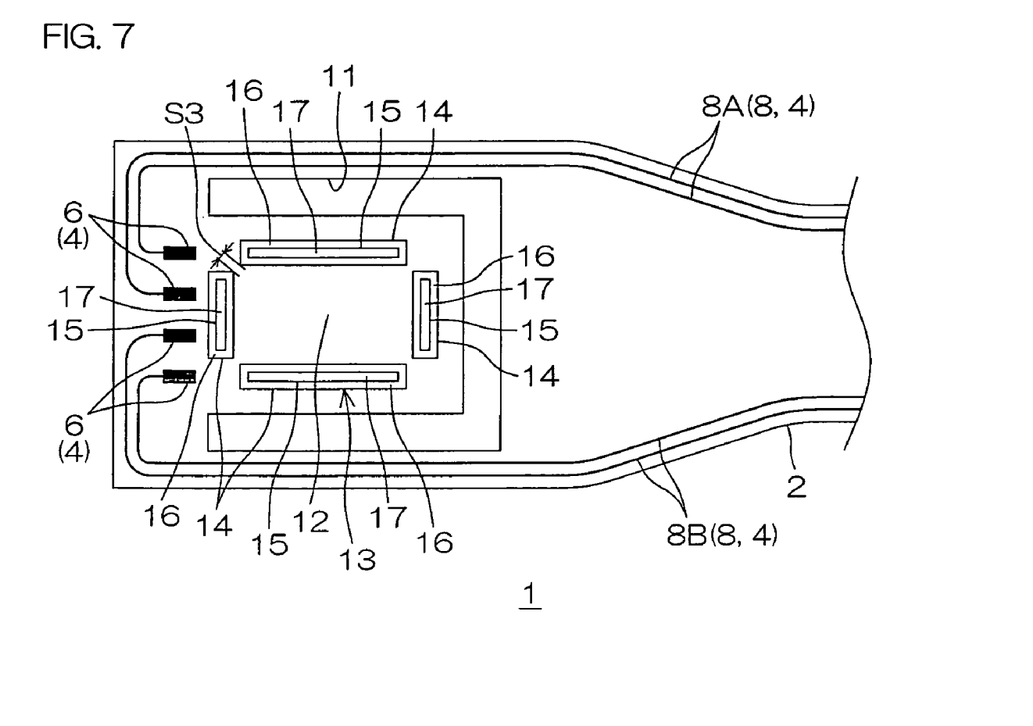
FIG. 7 is an enlarged plan view of the front end portion of the suspension board with circuit of COMPARATIVE EXAMPLE 2.

A suspension board with circuit was obtained in the same manner as in EXAMPLE 1 except that the upper pedestal and the lower pedestal were formed in the shape of four linear ribs which were formed in mutually spaced-apart relation to correspond to the four edges of the bonding surface (see FIG. 7). A spacing S3 between the individual lower pedestals was 100 μm.

(Evaluation)

A slider was mounted on each of the suspension boards with circuits of the example and the comparative examples. That is, an adhesive was coated first on the bonding surface located within the pedestal (upper and lower pedestals) by a printing method. The adhesive was coated on the bonding surface to protrude from the pedestal till reaching a position above the upper pedestal. Then, the slider was placed on the pedestal such that the lower surface of the slider comes in contact with the upper surface (surface of the metal plating layer) of the upper pedestal.

Thereafter, the adhesive was cured by heating to bond the slider to the bonding surface via the adhesive, while the slider was caused to be supported on the pedestal.

As a result, in the suspension board with circuit of EXAMPLE 1, it was recognized that the slider was reliably bonded to the bonding surface, and placed in a steady position on the pedestal.

By contrast, in the suspension board with circuit of COMPARATIVE EXAMPLE 1, it was recognized that the slider was bonded to the bonding surface in a state where it was not in a steady position.

In the suspension board with circuit of COMPARATIVE EXAMPLE 2, it was recognized that the slider was placed on the pedestal in a steady position, but it wobbled due to insufficient adhesion between itself and the bonding surface.

While the illustrative embodiments of the present invention are provided in the above description, such is for illustrative purpose only and it is not to be construed limitative. Modification and variation of the present invention which will be obvious to those skilled in the art is to be covered by the following claims.

What is claimed is:

1. A suspension board with circuit comprising:
a metal supporting board;
an insulating layer formed on the metal supporting board;
a conductive layer formed on the insulating layer; and
a pedestal for supporting a slider, wherein the pedestal comprises:
a lower pedestal made of the insulating layer, and formed in a continuous frame shape so as to surround a bonding surface of the metal supporting board to the slider; and
an upper pedestal made of the conductive layer, and formed in a discontinuous frame shape on the lower pedestal.

2. The suspension board with circuit according to claim 1, wherein
the lower pedestal is formed of a continuous surrounding wall, and
the upper pedestal is formed of a surrounding wall formed with one cut-away portion.

3. The suspension board with circuit according to claim 2, further comprising:
a terminal portion made of the conductive layer, and disposed adjacent to the pedestal, wherein
the cut-away portion is formed in a portion of the surrounding wall of the upper pedestal opposite to a portion thereof adjacent to the terminal portion.

* * * * *